(No Model.) 2 Sheets—Sheet 1.

J. E. STUART & U. S. JAMES.
ARMATURE CORE FOR ELECTRIC MOTORS.

No. 497,504. Patented May 16, 1893.

Witnesses
Inventors,
James E. Stuart and
U. S. James,
By Alexander Downs,
Attorneys

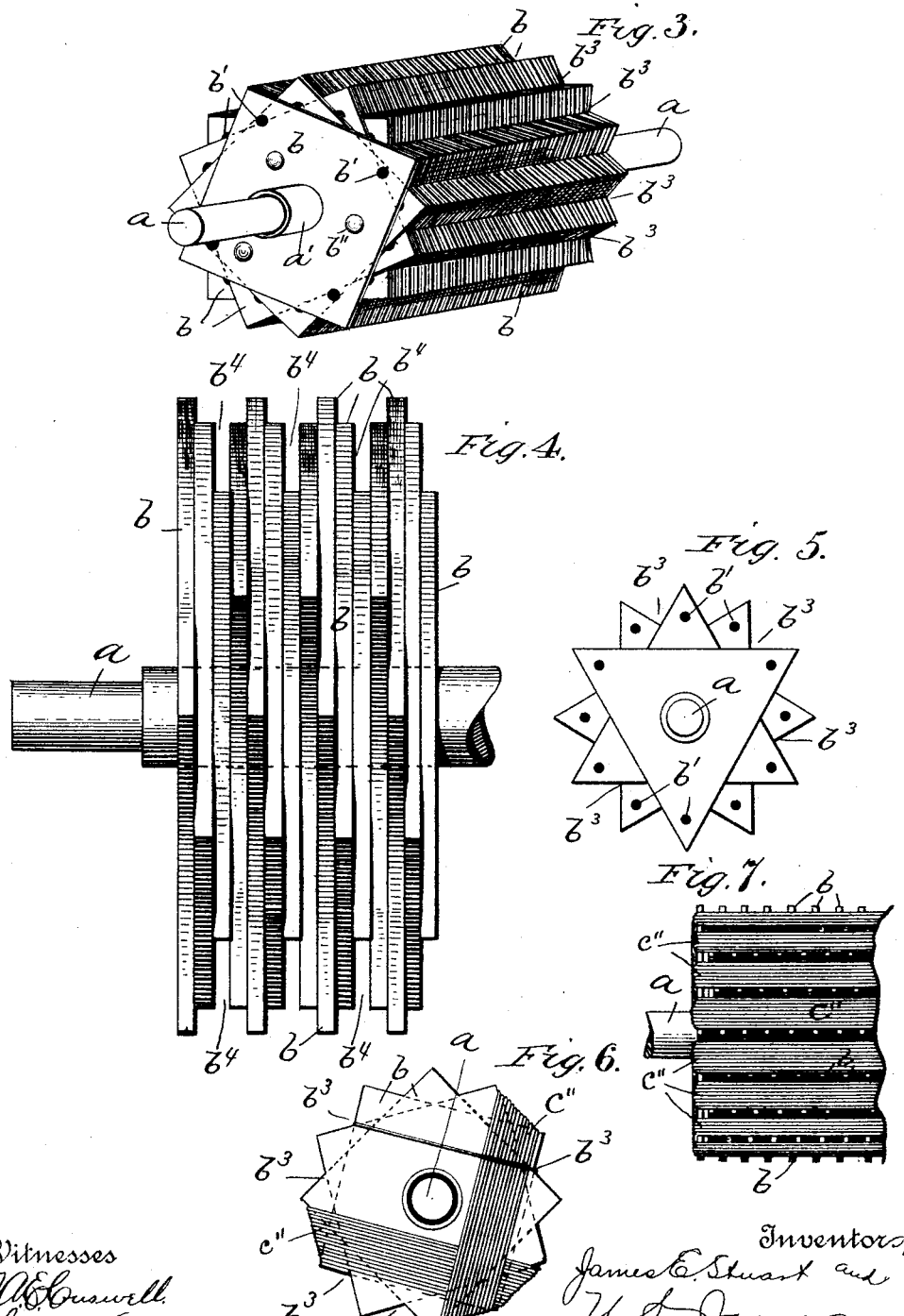
J. E. STUART & U. S. JAMES.
ARMATURE CORE FOR ELECTRIC MOTORS.
No. 497,504. Patented May 16, 1893.

UNITED STATES PATENT OFFICE.

JAMES E. STUART AND ULYSSES S. JAMES, OF HELENA, MONTANA.

ARMATURE-CORE FOR ELECTRIC MOTORS.

SPECIFICATION forming part of Letters Patent No. 497,504, dated May 16, 1893.

Application filed October 24, 1892. Serial No. 449,791. (No model.)

*To all whom it may concern:*

Be it known that we, JAMES E. STUART and ULYSSES S. JAMES, citizens of the United States, residing at Helena, in the county of Lewis and Clarke and State of Montana, have invented certain new and useful Improvements in Armature-Cores for Electromotors and Dynamo and Magneto-Electric Machines, of which the following is a specification, reference being had therein to the accompanying drawings, in which—

Figure 1:
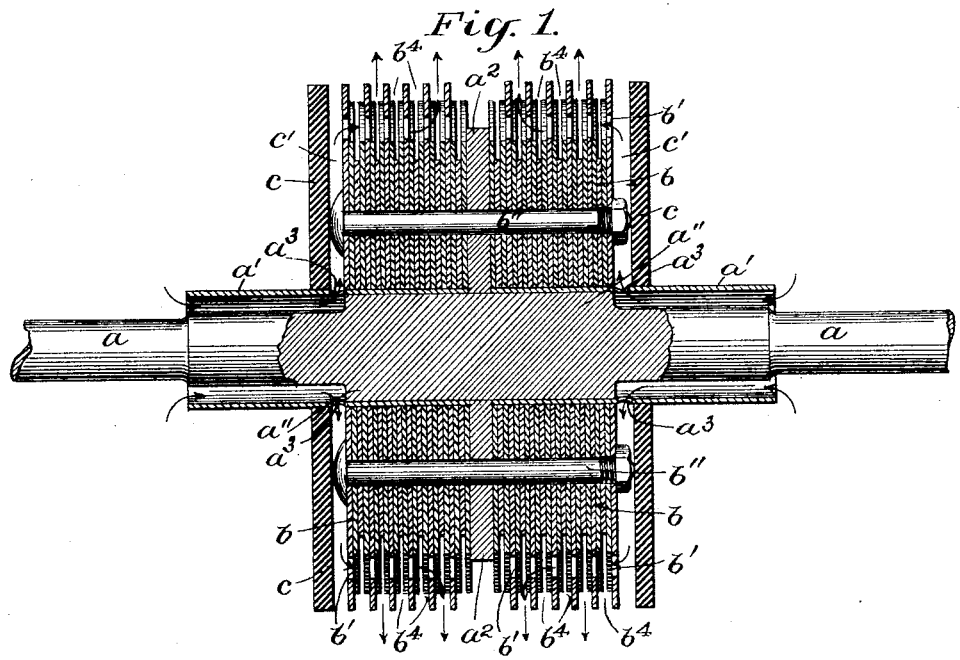
Figure 2:
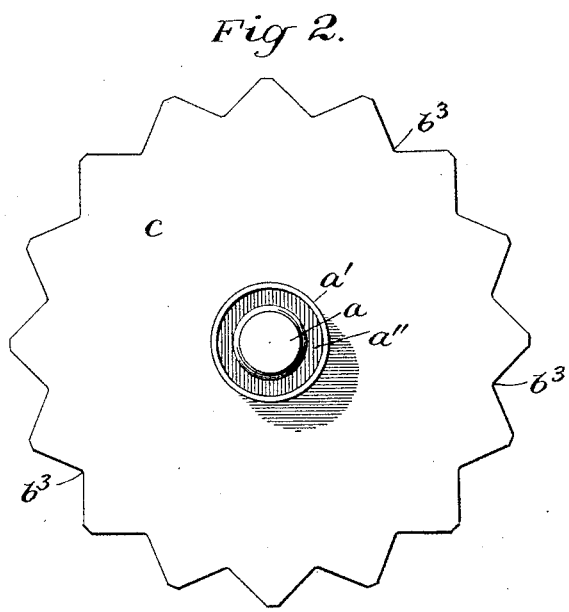

Figure 1 is a vertical longitudinal sectional view of one form of the core and its shaft, the wire coils being omitted; Fig. 2, an end view thereof; Fig. 3, a perspective view of our improved armature core, the wire coils and the end-pieces being omitted in order to better show its construction; Fig. 4, an enlarged side elevation of a portion thereof; Fig. 5, an end elevation of another form of the armature core; the insulating end-plate being removed; Fig. 6 an end elevation showing the preferred manner of winding the coils on this armature; and Fig. 7 a partial side elevation of the same showing more particularly the air exit openings between the coils.

The main objects of this invention are to produce an armature core that shall be extremely economical, simple and durable in construction, that shall ventilate itself thoroughly during operation, and which may have its coils readily wound upon it in a lathe thereby especially adapting it to small motors for high voltages, as more fully hereinafter appears.

In the drawings, $a$ designates the armature shaft, $a'$ $a'$ sections of a sleeve rigidly secured on a central enlargement thereon $a''$ and having their opposite ends projecting beyond the enlargement, $a^2$ a central disk secured rigidly on the enlargement $a''$. Instead of making the tube in two sections and securing the disk $a^2$ directly on the shaft between the inner ends of the sections, as just described, the tube may be made in a single piece and the disk secured centrally thereon if desired. Upon the tube sections, on opposite sides of the central disk are slipped the thin laminæ or plates $b$ of iron or other magnetic metal, which compose the core proper of the armature and which are rigidly secured against displacement by long bolts $b''$ passing through the body of plates and the central disk $a^2$. In the construction and arrangement of these plates reside the essential features of this invention.

Secured on the tube, one near each end of the core, are two disks $c$ of some suitable insulating material, said disks resting against the heads and nuts of the clamping-bolts $b''$ and thereby forming air spaces $c'$ between the disks and the ends of the core, which spaces communicate with the spaces between the ends of the tube and the shaft by openings $a^3$ in the tubes. The edges of these disks $c$ are notched or scalloped to coincide with the longitudinal elevations and depressions of the core.

The plates $b$ are preferably, approximately square, as shown in Figs. 3 and 4, and they are so disposed upon the shaft that a series of longitudinal V-shaped grooves $b^3$ are formed the entire length of the core, (for the reception of the longitudinally-wound wire coils $c''$ that form the armature circuit) and a series of circumferential ventilating spaces $b^4$ formed around the core under the coils. These plates may be arranged as shown in Figs. 1, 2, 3 and 4 where sixteen longitudinal grooves are formed, or they may be arranged to form twelve grooves, as shown in Fig. 6, or any greater or less number of grooves or channels may be formed. As shown most clearly in Figs. 3 and 4 to obtain these grooves it is simply necessary that a series of the plates be so adjusted rotatively on the shaft that their radial corners or apexes shall come in line with each other, it being necessary that the apexes of no two adjoining plates shall come opposite each other. In this manner the circumferential grooves which are formed between the angular projections or apexes of the plates, are helically arranged and irregular in form and extend the entire length of the core, beginning at one end and passing around and around the core and terminating at the other end thereof. The number of these grooves corresponds to the number of radial apexes or corners on each plate, in this instance four being employed.

Instead of the rectangular plates described, it is evident that the core may be constructed of triangular plates as shown in Fig. 5, or other shaped plates may be used, the only requisite being that the plates must have the radial projections to form the two series of intersecting grooves.

We prefer the rectangular and the triangular plates, however, as by their use we not only avoid all waste in cutting the plates from the large sheets of metal, but we also obtain a solid and strong core which will be durable and economical in construction.

The coils are wound as shown in Figs. 6 and 7, that is, they extend longitudinally of the core, as usual, and rest in the longitudinal V-grooves, the wires passing across the insulating plates at the ends of the core, at one side of the center thereof, so that they avoid touching the shaft. By thus winding the coils so that they shall not touch the shaft enables them to be wound upon the core in a lathe, which results in an important saving of labor in constructing the armature. When the core is thus wound with wire the ends are practically covered by the coils, and the only parts of the plates that are exposed are the apexes of the corners or projections which project out between the coils as shown in Fig. 7. In this manner the spaces between the projecting apexes put the spiral ventilating grooves in ample communication with the open air so that during the revolution of the armature there will be a continuous circulation of fresh air under the coils and around the active parts of the laminæ, thereby serving to materially lower the temperature of the parts. It is this thorough ventilation of the coils and plates that we regard as the essential feature of this invention.

To provide for a more thorough circulation of the air in the spiral channels, we form holes $b'$ in the plates near the apexes thereof and put the channels in direct communication with each other. These holes may extend the full length of the core as shown in Fig. 1 or they may simply extend through the end plates of the core as shown in Fig. 3; in either case the circulation will be thorough as the revolution of the core will cause the air to be drawn in through the sleeves and end spaces $c'$ and through the end holes and carried around the spiral grooves and expelled at the peripheral openings between the coils, as shown by the arrows in Fig. 1.

It is evident that our system of longitudinal grooves and spiral intersecting grooves for thoroughly ventilating the coils and active parts of the core may be used with a core constructed otherwise than by means of a series of plates for instance, the system might be used with a core cast solid or in sections or otherwise made.

Having thus fully described our invention, what we claim is—

1. In an armature core, the combination, of a shaft, and a series of thin metal plates secured rigidly thereon, said plates being angular in formation so that their corners form pointed radial projections, the plates being arranged on the shaft in such a manner that the pointed projections form longitudinal V-shaped grooves and intersecting circumferential grooves, extending around the core substantially as described.

2. The combination in an armature core of a shaft and a series of thin angularly-formed metal plates rigidly secured thereon, the plates being adjusted rotatively on the shaft so that the radial corners of the adjacent plates will come out of line with each other, whereby the projecting corners of the plates will form a series of longitudinal V-shaped grooves and a series of spiral intersecting grooves, as and for the purpose described.

3. The combination, in an armature, of a shaft, a core thereon, having a series of radial angular corners forming a series of longitudinal V-shaped grooves, and the wire-coils wound longitudinally around the core and resting in the V-shaped grooves, said coils crossing the ends of the core at one side and entirely free of the shaft, as and for the purpose described.

4. In an armature core the combination of a shaft carrying a central enlargement, a rigid plate $a^2$ carried by said enlargement, a tube secured on said enlargement and having its ends projecting out beyond the same, forming air-spaces, plates, secured on the shaft and bolted rigidly to plate $a^2$, said plates forming exterior longitudinal and spiral grooves, and disks $c$ secured on the ends of the tube near the core plates, the spaces between these disks being in communication with the air-spaces inside the tubes, substantially as and for the purpose described.

In testimony whereof we affix our signatures in presence of two witnesses.

JAMES E. STUART.
ULYSSES S. JAMES.

Witnesses:
W. CARPENTER,
F. M. BRADLEY.